US009730076B2

(12) United States Patent
Bank et al.

(10) Patent No.: US 9,730,076 B2
(45) Date of Patent: *Aug. 8, 2017

(54) PROTECTING MOBILE DEVICES FROM MALWARE

(71) Applicant: International Business Machines Corporation, Armonk, NY (US)

(72) Inventors: Judith H. Bank, Cary, NC (US); Lisa M. Bradley, Cary, NC (US); Aaron J. Quirk, Austin, TX (US); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,245

(22) Filed: May 27, 2015

(65) Prior Publication Data

US 2016/0173506 A1 Jun. 16, 2016

Related U.S. Application Data

(63) Continuation of application No. 14/568,160, filed on Dec. 12, 2014.

(51) Int. Cl.
G06F 7/04 (2006.01)
H04W 12/12 (2009.01)
(Continued)

(52) U.S. Cl.
CPC .......... *H04W 12/12* (2013.01); *G06F 21/567* (2013.01); *G06F 21/568* (2013.01); *H04L 63/14* (2013.01)

(58) Field of Classification Search
CPC ...................................... G06F 21/56
See application file for complete search history.

(56) References Cited

U.S. PATENT DOCUMENTS 6,292,833 B1 * 9/2001 Liao ...................... H04W 12/08
709/219
7,418,619 B1 * 8/2008 Uhlmann ............ G06F 11/1451
714/2

(Continued)

FOREIGN PATENT DOCUMENTS

WO 2011127488 A2 10/2011

OTHER PUBLICATIONS

Motorola, How do I transfer files to/from my DROID RAZR HD/MAXX HD?, https://motorola-global-portal.custhelp.com/app/answers/detail/a_id/90460, 2014.

(Continued)

*Primary Examiner* — Christopher Brown
(74) *Attorney, Agent, or Firm* — Garg Law Firm, PLLC; Rakesh Garg; Jeffrey S. LaBaw

(57) ABSTRACT

Using a system distinct from a mobile device, the mobile device is switched from a first mode to a second mode to access a set of data storage locations in the mobile device. All malware-susceptible data stored in the set of data storage locations is received at the system from the mobile device to form received data, which is analyzed at the system to detect a malware from a set of malware in a first portion of the received data. Responsive to the analyzing, the first portion of the received data is modified at the system to form a modified first portion, wherein the modifying removes the malware from the first portion. The system stores the modified first portion in a first data storage location in the mobile device and a second portion of the received data in a second data storage location in the mobile device.

16 Claims, 5 Drawing Sheets

(51) Int. Cl.
    *H04L 29/06*       (2006.01)
    *G06F 21/56*       (2013.01)

(56) References Cited

U.S. PATENT DOCUMENTS

| | | | |
|---|---|---|---|
| 2011/0145927 A1* | 6/2011 | Hubner | G06F 21/31 |
| | | | 726/26 |
| 2012/0079596 A1 | 3/2012 | Thomas et al. | |
| 2013/0047256 A1 | 2/2013 | Man et al. | |
| 2013/0185800 A1* | 7/2013 | Miller | G06F 21/568 |
| | | | 726/24 |
| 2013/0298243 A1 | 11/2013 | Kumar et al. | |

OTHER PUBLICATIONS

Metago, Forums / Astro News & Updates / Known Issues, http://support.metago.net/entries/20565473- UPDATED-Can-t-view-find-my-external-storage-sd-card-USB, Oct. 19, 2011.

Cunnigham, The PC inside your phone: A guide to the system-on-a-chip, http://arstechnica.com/gadgets/2013/04/the-pc-inside-your-phone-a-guide-to-the-system-on-a-chip/, Apr. 10, 2013.

Android, Using the Emulator, http://developer.android.com/tools/devices/emulator.html.

MAXIMUMPC, 10 Reasons to Root Your Android Device, http://www.maximumpc.com/article/features/10_reasons_root_your_android_device, Jan. 3, 2012.

* cited by examiner

PROTECTING MOBILE DEVICES FROM MALWARE

TECHNICAL FIELD

The present invention relates generally to a method for protecting data from viruses and other malware. More particularly, the present invention relates to a method for protecting mobile devices from malware.

BACKGROUND

A malware is any code, data, communication, or method that is applied to a data processing system covertly, unintentionally, or without a user's permission, to cause an undesirable behavior or operation of the data processing system. Often, a malware is difficult to discover in the data processing system, difficult to remove upon discovery, or both.

For example, some malware install code on a data processing system that causes the data processing system to track a user's keystrokes, such as when entering passwords, and transmit a record of the keystrokes to a remote computer. As another example, some other malware cause unintended diversions in an application's operation. Browser operation hijacking is an example of such a malware. Many types of malware exist today, and new ones are created almost on a daily basis.

A computer virus comprises code or data and is a manner of delivering malware to a data processing system. For example, a common method for delivering a virus to a user's data processing system includes modifying content to hide the code or data of a virus. As an example, unbeknownst to a user who downloads or receives certain content, the content is modified to include a virus. The virus is designed to cause a data processing system of the user to perform a function that is not desired, permitted, intended, or expected by the user. When the user receives the virus-infected content on the user's data processing system, the virus modifies code or data in the data processing system to cause the data processing system to perform the undesired, not permitted, unintended, or unexpected function of the malware.

A variety of antivirus and/or malware protection applications (hereinafter collectively referred to as "malware protection application") are presently available for detecting and removing viruses and/or malware of various types, (hereinafter collectively referred to as "malware"), from a user's data processing system, such as from desktop or laptop computers, server computers, and the like. Typically, a malware protection application scans all data, including code, that is susceptible to malware on a given data processing system to identify the presence of a malware in the data using known malware signatures. When the malware protection application finds a malware, the malware protection application modifies the portion of data in which the malware is detected to remove the malware. The modified portion of the data thereafter operates without the undesired, not permitted, unintended, or unexpected function of the malware.

SUMMARY

The illustrative embodiments provide a method for protecting mobile devices from malware. An embodiment includes a method for protecting data of a mobile device. The embodiment causes, using a processor at a data processing system distinct from the mobile device, the mobile device to switch from a first mode to a second mode to access a set of data storage locations in the mobile device. The embodiment receives, at the data processing system, from the mobile device to form received data, all malware-susceptible data stored in the set of data storage locations. The embodiment analyzes, at the data processing system, the received data to detect a malware from a set of malware in a first portion of the received data. The embodiment modifies, at the data processing system, responsive to the analyzing, the first portion of the received data to form a modified first portion, wherein the modifying removes the malware from the first portion. The embodiment causes, from the data processing system, the modified first portion to be stored in a first data storage location in the mobile device and a second portion of the received data to be stored in a second data storage location in the mobile device.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
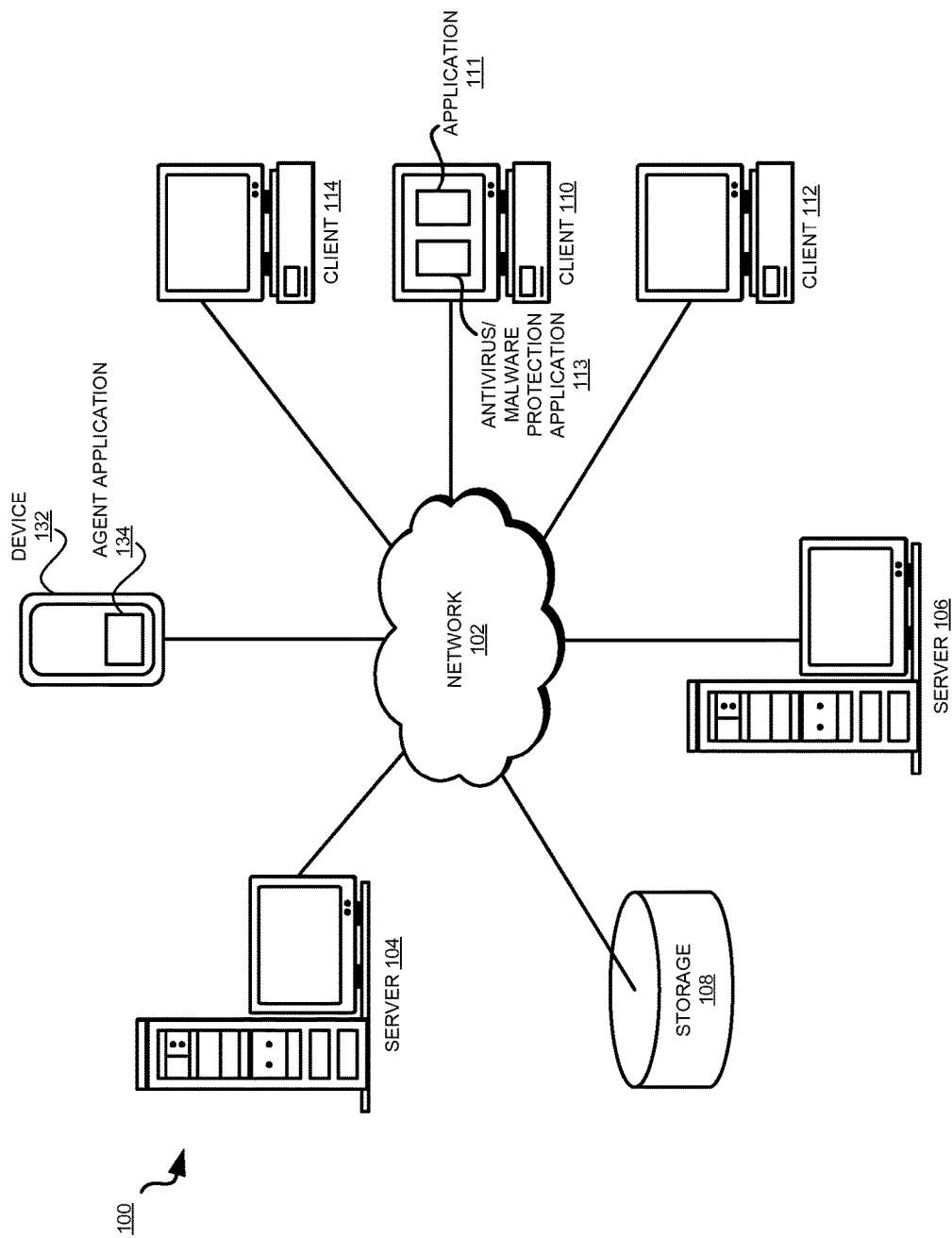
FIG. 1 depicts a block diagram of a network of data processing systems in which illustrative embodiments may be implemented.

Within the scope of the illustrative embodiments, a mobile device is any handheld, wearable, or embedded data processing system, as different from a laptop computer, which can be used for voice and data communications. As one example, a smartphone and a tablet computer are some of examples of the mobile devices contemplated by the illustrative embodiments. A wearable computing device, such as a computing device embedded in an eyewear or a wrist watch, is another example of mobile devices contemplated by the illustrative embodiments. Data processing systems embedded in a vehicle, appliance, or tool, are some more examples of the mobile device contemplated by the illustrative embodiments.

Generally, a mobile device according to the illustrative embodiments is distinct from a desktop computer, a laptop computer, or a server computer (collectively, "computer") because the mobile device is often configured and/or purposed significantly differently from such computers, even if the architecture of the mobile devices loosely resembles that of a computer. For example, a mobile device is configured to interface with a significantly limited number of other devices and peripherals as compared to the various computers, is optimized to perform a certain activity (hereinafter, "normal activity" of the mobile device), or both.

For example, a smartphone is optimized to be significantly more compact than a computer, to be carried in a user's pocket or purse, to perform voice communication as a normal activity, and then to perform other functions. A wearable optical mobile device is optimized to visually view a user's physical environment and visually display interactive information in an extremely compact package wearable on a user's face. A wrist watch mobile device is a sub-compact device wearable on a user's wrist, to perform as a remote wearable display or controller of another data processing system or mobile device.

Furthermore, mobile devices often use operating systems, or versions thereof, that are distinct from the operating systems or versions thereof that are usable with a computer. For example, the operating systems usable in mobile devices are more compact, scaled-down, mobile device-specific feature enabled, as compared to their counterparts that are purposed for use in computers.

Additionally, although mobile devices are rapidly evolving into powerful devices, so are the computers, and at any given point in the evolutionary scale of computing platforms, a mobile device is significantly less powerful than a computer. As an example, the computing power of a mobile device and a computer can be compared in terms of the memory available therein, the type of processor therein, and the capabilities of other hardware components therein.

The illustrative embodiments recognize that mobile devices are fast becoming malware targets because the increasing amounts of information available on mobile devices owing to the increasing capabilities of the modern day mobile devices. For example, users now store personal and business data on their smartphones, using the mobile devices for banking, email, and Internet access. For these and other similar reasons, the mobile devices have become attractive targets for hackers as a new way to acquire passwords, financial information, and personal identity data. Malware in mobile devices can also initiate expensive phone calls, destroy data, perform industrial spying or sabotage, destroy applications, record conversations, and possibly render the mobile device unusable.

The illustrative embodiments recognize that presently available malware protection applications are designed to analyze and remove malware from computers, not mobile devices. The illustrative embodiments recognize that the presently available malware protection applications for computers are not usable or ineffective on mobile devices.

As one example reason, the illustrative embodiments recognize that the presently available malware protection is less effective on mobile devices than on computers because the mobile devices have comparatively less powerful processors as compared to the processing power available in computers. The need to miniaturize mobile devices and reduce the size and weight of the mobile device and the battery power source therein is partially responsible for the reduced processing power on the mobile devices. The processing power and the battery power-source is largely insufficient to scan files and malware profiles as background processes on the mobile devices while still maintaining the availability and adequate response time for the mobile devices' normal activity.

Some mobile devices use operating systems that support only a single active task. Such configurations prevent malware monitoring while the mobile device is performing the normal activity or another task, which, in many cases, is the time when malware and security scanning is most likely to be effective.

For these and other reasons, the presently available malware protection applications are unusable or unsuitable for use with mobile devices. Thus, mobile devices are vulnerable to malware attacks and protecting mobile devices from malware is desirable.

The illustrative embodiments used to describe the invention generally address and solve the above-described problems and other problems related to data protection on mobile devices. The illustrative embodiments provide a method for protecting mobile devices from malware.

A first embodiment operating on a computer, such as a desktop computer, laptop computer, or a server computer, connects with a mobile device. The embodiment causes the mobile device to enter a mode whereby the memory and the file-system of the mobile device become accessible to the embodiment. Optionally, the mode further allows the embodiment to access the content present on the screen of the mobile device (the screen content).

The embodiment downloads or receives all malware-susceptible data from the mobile device, such as from the device memory, the file-system in the device, and optionally from the screen of the device. Malware-susceptible data in a location or part of a mobile device is data that can be or could be infected by a malware, is in fact infected by a malware, is desirable for infecting by a malware, or some combination thereof. Malware-susceptible data can also include data relative to which an undesired, un-permitted, unintended, or unexpected function of a malware is likely to be performed.

In a second embodiment, changing the mode of the mobile device for receiving the data in this manner temporarily disables certain functions or operations on the mobile device. In such cases, upon the completion of the download, the embodiment resets or changes the mode to another mode whereby the mobile device resumes normal activity and other functions. A third embodiment further disconnects the data transfer connection between the computer and the mobile device thereafter.

A fourth embodiment subjects the received data from the mobile device to analysis for malware detection on the computer. For example, in one example scenario, the embodiment uses a malware protection application available on the computer or accessible from the computer to analyze the data downloaded from the mobile device. The embodiment causes the malware protection application to remedy any malware-affected portions of the downloaded data. Remedying a malware-affected portion of data changes or manipulates that portion of the data.

A fifth embodiment uploads the analyzed data, including the remedied portions of the data, to their respective locations in the mobile device. For example, if a portion of data was obtained from a particular memory location in the mobile device, the corresponding remedied portion of the data is stored in that memory location in the mobile device, and so on with respect to the memory, the file-system, and the screen of the mobile device. When a data transfer connection is disconnected or otherwise disabled after the download from the mobile device, a sixth embodiment reestablishes the connection prior to the upload.

A seventh embodiment also supplies one or more reports to the mobile device. For example, under one example scenario, prior to any remediation of the data, the embodiment provides an analysis report to the mobile device. The report allows a user of the mobile device or an application on the mobile device to examine the information about the malware that were found in one or more portions of the data of the mobile device. An eighth embodiment optionally allows a user or application on the mobile device to provide an input responsive to the analysis report. The input allows the remediation to progress relative to zero or more malware reported in the analysis report.

A ninth embodiment further provides a post-remediation report to the mobile device. The post-remediation report informs the user or the application on the mobile device about the success or failure of a remediation effort relative to a malware, portions of the data on the mobile device that was changed during the remediation, the manner of changing the data, additional notes, suggestions, or cautionary information, or a combination thereof.

Thus, the illustrative embodiments overcome the processing power limitations, prolonged downtime of the mobile device, and sparse scanning of the mobile data in the mobile devices. The illustrative embodiments utilize the superior processing power of a computer to provide effective malware protection to the mobile device. The illustrative embodiments reduce the downtime, if any, of the normal activities of the mobile device to only the time needed to download and upload the data from and to the mobile device. The illustrative embodiments analyze and remedy all malware-susceptible data of the mobile device from all possible locations of malware-susceptible data in the mobile device, not just select few files.

The illustrative embodiments are described with respect to the memory, the file-system, and the screen as the possible sources of all the malware-susceptible data in the mobile device, but such locations are not intended to be limiting on the illustrative embodiments. With the large number of mobile device architectures in use today, and with the evolution of the mobile devices, more locations within the mobile devices may contain malware-susceptible data. Without departing the scope of the illustrative embodiments, an embodiment described herein can be adapted to download and upload data from and to such additional locations in a mobile device.

The illustrative embodiments are described with respect to certain types of mobile devices, communications, connections, operations, activities, functions, data, locations of data, analyses, remediation, malware, viruses, inputs, reports, tools, malware protection applications, rules, policies, algorithms, data processing systems, environments, components, and applications only as examples. Any specific manifestations of such artifacts are not intended to be limiting to the invention. Any suitable manifestation of such artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment of the invention, either locally at the mobile device or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
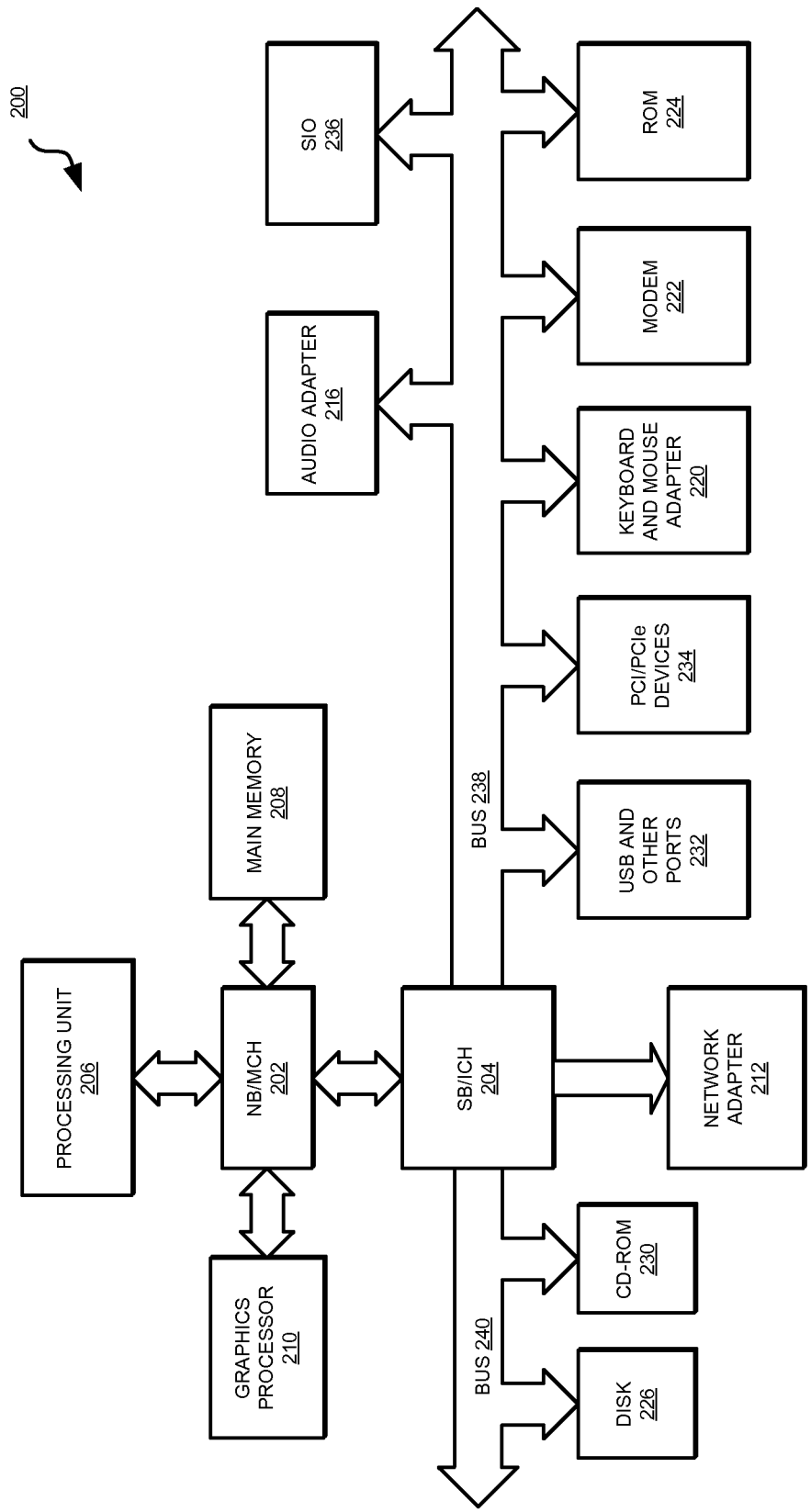
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Device 132 is a mobile device. Agent application 134 implements an example mode-switching method to allow mobile device 132 to be put in a suitable mode for downloading and uploading data according to an embodiment described herein. Application 111 implements one or more embodiments described herein. Client 110 is an example computer that connects with mobile device 132 for downloading all malware-susceptible data from mobile device 132, and for uploading the remedied data to mobile device 132. The connection between client 110 and mobile device 132 can utilize network 102 or can be a direct wireline or wireless connection. Malware protection application 113 is an existing malware protection application suitable for executing on a computer, such as on client 111, server 104, or client 112. Application 111 utilizes malware protection application 113 to perform the analysis and remediation of malware in the malware-susceptible data or malware-infected data downloaded from mobile device 132. A report provided by application 111 to mobile device 132 results from a report generated from malware protection application 113. In one embodiment, application 111 modifies a report generated from malware protection application 113 and presents a modified form of the report to mobile device 132.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of a device, such as device 132 in FIG. 1 in which computer usable program code or instructions implementing the processes of the illustrative embodiments may be located. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as server application 111, malware protection application 113, or agent application 134 in FIG. 1, are located on storage devices, such as hard disk drive 226 or a similarly purposed solid-state data storage device, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
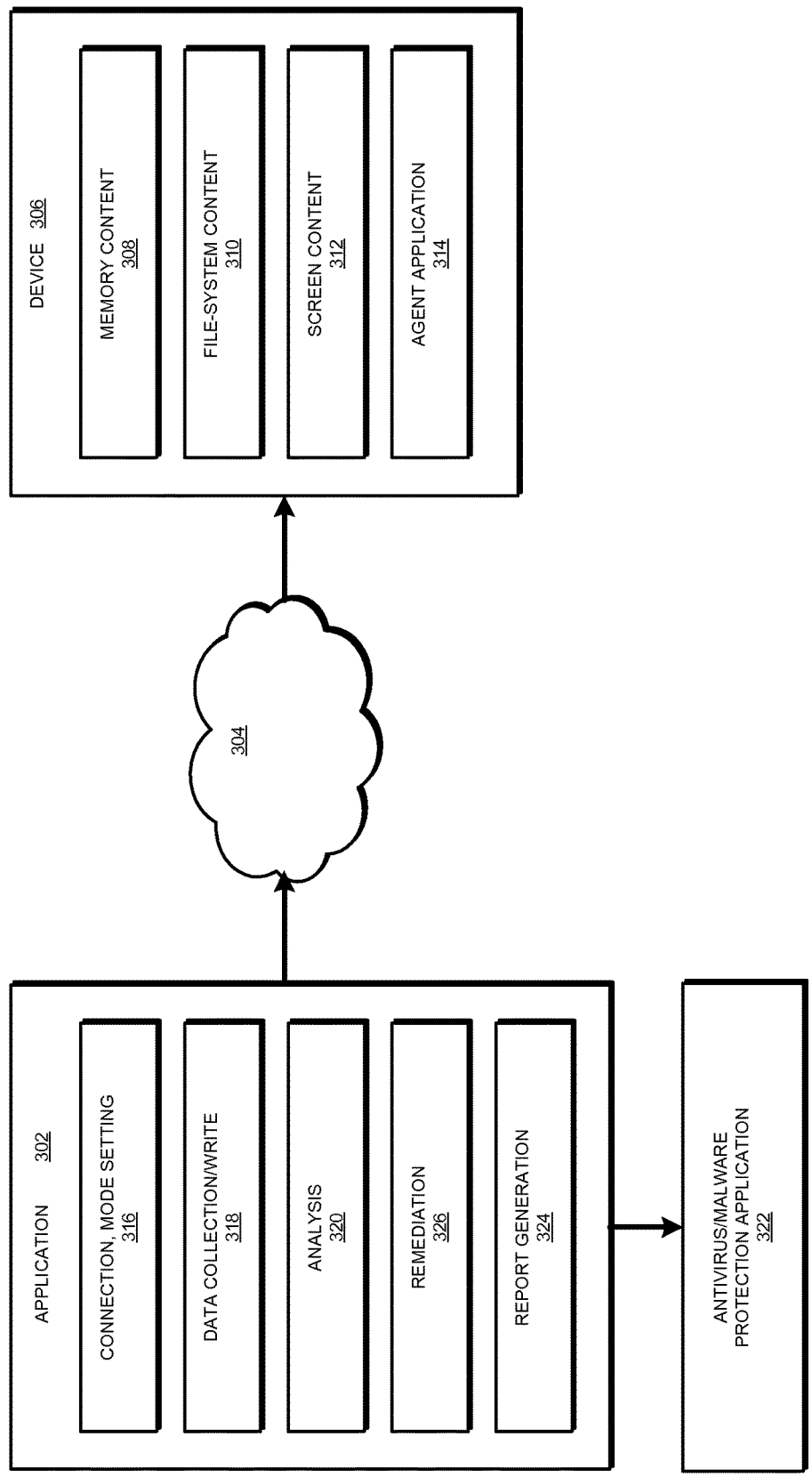
FIG. 3 depicts a block diagram of an example configuration for protecting mobile devices from malware in accordance with an illustrative embodiment.

With reference to FIG. 3, this figure depicts a block diagram of an example configuration for protecting mobile devices from malware in accordance with an illustrative embodiment. Application 302 is an example of application 111 in FIG. 1. Network 304 is an example of network 102 in FIG. 1, or may be a direct wireline or wireless data-path between a computer where application 302 is executing and mobile device 306. Mobile device 306 is an example of mobile device 132 in FIG. 1.

Content 308 in device 306 is all malware-susceptible content residing in a memory in mobile device 306. The memory of mobile device 306 where content 308 resides can be fixed in mobile device 306, removable from mobile device 306, or both. The memory of mobile device 306 where content 308 resides further includes memory in a processor, such as a cache memory, memory build into or belonging to an interface or adapter, memory designated for use by an operating system, and generally any memory not accessible or usable for storing data in a file-system.

Content 310 in device 306 is all malware-susceptible content residing in a file-system in mobile device 306. The data storage component of mobile device 306 where content 310 resides can be fixed in mobile device 306, removable from mobile device 306, or both. Generally, such data storage component includes any data storage device or memory that is accessible or usable for storing data in a file-system of mobile device 306.

Content 312 in device 306 is all malware-susceptible content previously displayed, presently displayed, about to be displayed, or remaining to be displayed on a screen in mobile device 306. The data storage component of mobile device 306 where content 312 resides can be, for example, a memory area designated for use by the graphical display component of mobile device 306. Such memory area may be a part of a memory component that is fixed in mobile device 306, removable from mobile device 306, or both. Generally, such memory area can be located in any data storage device or memory that is accessible or usable for storing data that is to be used for rendering a graphical display on the screen of mobile device 306.

Agent application 314 is an example of agent application 134 in FIG. 1. Agent application 314 can take the form of an application, a daemon, a process, a function call, or other suitable manifestation of one or more operations in mobile device 306. Such one or more operations include an operation that configures a data connection or data-path between mobile device 306 and application 302, and another operation that allows mobile device 306 to be configured in a mode such that application 302 can access content 308, 310, and 312. Such one or more operations include another operation that allows mobile device 306 to be configured out of such mode in the manner described elsewhere.

Application 302 includes component 316, which configures a data connection or data-path between application 302 and device 306, such as by utilizing agent application 314 or an equivalent thereof in mobile device 306. Component 316 also sets a mode in mobile device 306, such as via agent application 314 or an equivalent thereof in mobile device 306, such that application 302 access content 308, 310, and 312. When content 308, 310, and 312 is downloaded or received at application 302, component 316 optionally resets the mode or switches mobile device 306 to another mode such that mobile device 306 can resume normal activity or another function that might be, but not necessarily, prevented by the mode.

When a data connection for downloading with mobile device 306 is established, component 318 collects, downloads, or otherwise receives all malware-susceptible data from various parts or locations of mobile device 306, such as a combination of content 308, 310, and 312. In one embodiment, component 318 marshals the collected data such that when remedied data is ready, the marshaling can be used to write or upload the remedied data back to its corresponding part or location of mobile device 306.

Component 320 sends the data collected by component 318 to malware protection application 322 for analysis. Malware protection application 322 analyzes the collected data to identify whether a malware has infected a portion of the collected data, where such portion or portions are located in the collected data, and what kind of malware has caused the infection. The operation of mp 322 includes all similarly purposed analytical operations that are available in the presently available malware protection applications.

Malware protection application 322 optionally produces a report of the analysis. Report generation component 324 modifies the analysis report if and as needed according to the type of mobile device 306 and communicates the report to mobile device 306 in any suitable manner.

When the user or an application in mobile device 306 provides an input to select one or more malware infections to remedy in the collected data, remediation component 326 receives such an input. In one embodiment, the input at mobile device 306 is responsive to the analysis report sent by component 324. Remediation component 326 configures malware protection application 322 according to the input such that malware protection application 322 can perform the remediation operation consistent with the selections made at mobile device 306.

Malware protection application 322 optionally produces a report of the remediation. Report generation component 324 modifies the remediation report if and as needed according to the type of mobile device 306 and communicates the report to mobile device 306 in any suitable manner.

Component 316 configures a data connection or data-path between application 302 and device 306, such as by utilizing agent application 314 or an equivalent thereof in mobile device 306. Component 316 also sets a mode in mobile device 306, such as via agent application 314 or an equivalent thereof in mobile device 306, such that application 302 can write remediated content 308, 310, and 312 in their respective parts or locations in mobile device 306. When content 308, 310, and 312 is written or uploaded at mobile device 306, component 316 optionally resets the mode or switches mobile device 306 to another mode such that mobile device 306 can resume normal activity or another function that might be, but not necessarily, prevented by the mode.

When a data connection with mobile device 306 is established for uploading, component 318 writes all remedied malware-susceptible data to their respective parts or locations of mobile device 306. In one embodiment, component 318 utilizes the marshaling that was associated with the data at the time of collection to write or upload the remedied data back to its corresponding part or location of mobile device 306.

Figure 4:
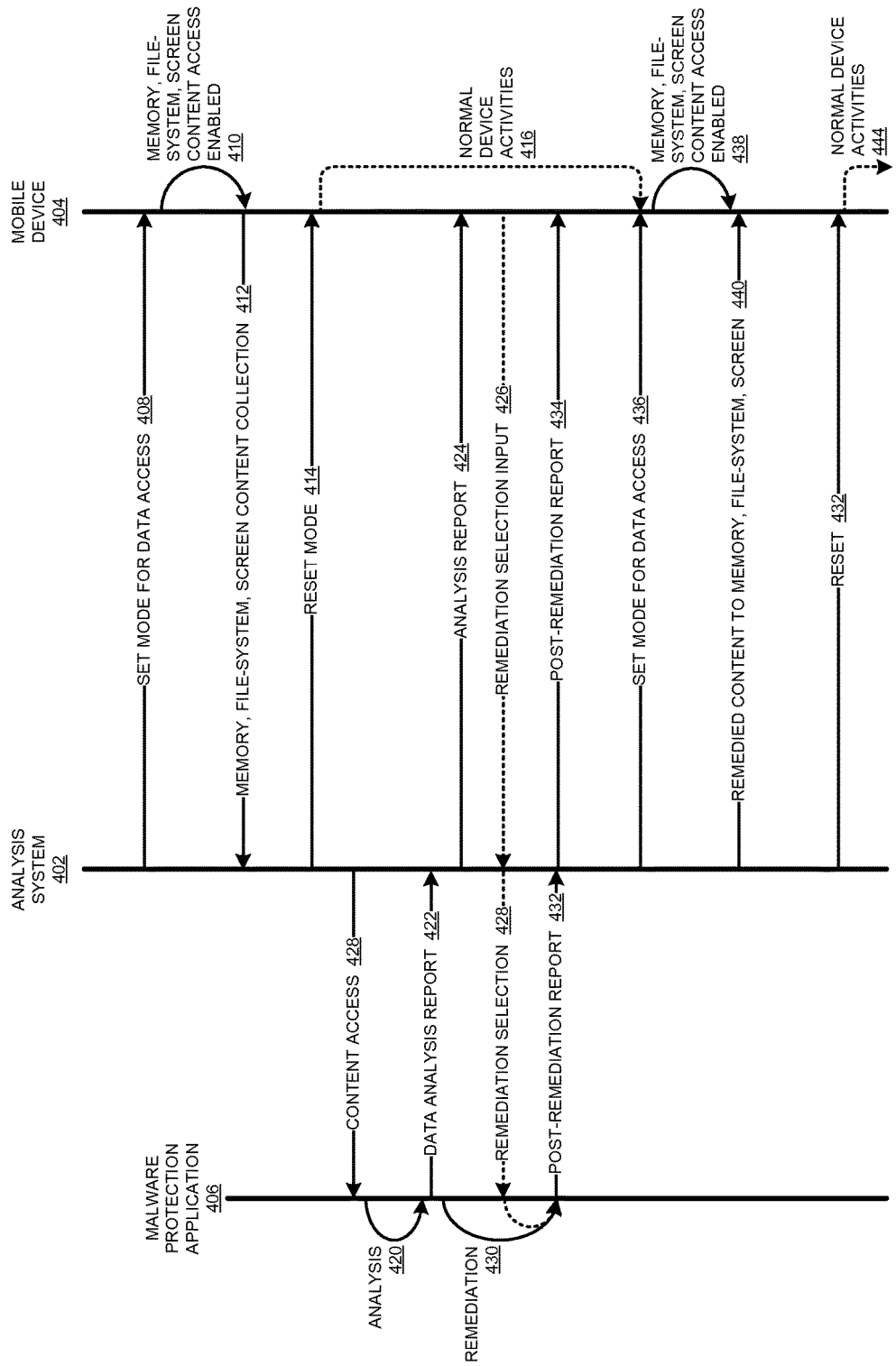
FIG. 4 depicts a timing diagram of an example process for protecting mobile devices from malware in accordance with an illustrative embodiment.

With reference to FIG. 4, this figure depicts a timing diagram of an example process for protecting mobile devices from malware in accordance with an illustrative embodiment. Analysis system 402 is an example of computer 110 in FIG. 1, where application 302 of FIG. 3 can execute. Mobile device 404 is an example of mobile device 306 in FIG. 3. Malware protection application 406 is an example of malware protection application 322 in FIG. 3.

System 402 sets (408) a mode at device 404 for data access. The setting of the mode enables (410) access to all parts or locations where malware-susceptible data may reside. System 402 receives (412) all such data from mobile device 404. System 402 resets (414) the mode, permitting mobile device 404 to resume (416) normal activities.

System 402 sends (418) the collected content to malware protection application 406. Malware protection application 406 analyzes (420) the data for malware infection. Malware protection application 406 provides (422) a data analysis report to system 402. System 402 sends (424) the analysis report, or a version thereof, to mobile device 404.

System 402 may optionally receive (426) a remediation selection input from mobile device 404. When received, system 402 configures (428) malware protection application 406 for selective remediation according to the input. Malware protection application 406 remedies (430) the data according to the remediation selection 428 when available. When remediation selection 428 is not available, such as in a default configuration where malware protection application 406 is configured to remedy all malware infections found in the data, or when mobile device 404 does not provide input 426, remediation 430 begins as soon as practicable after analysis 420 and analysis report 422. Remediation of a portion of data modifies that portion of the data.

Malware protection application 406 provides (432) a data remediation report to system 402. System 402 sends (434) the remediation report, or a version thereof, to mobile device 404.

System 402 sets (436) a mode at device 404 for data access. The setting of the mode enables (438) access to all parts or locations from where malware-susceptible data was collected in step 412. System 402 writes (440) the modified as well as unmodified portions of the collected data in their respective locations in mobile device 404. System 402 resets (442) the mode, permitting mobile device 404 to resume (444) normal activities.

Figure 5:
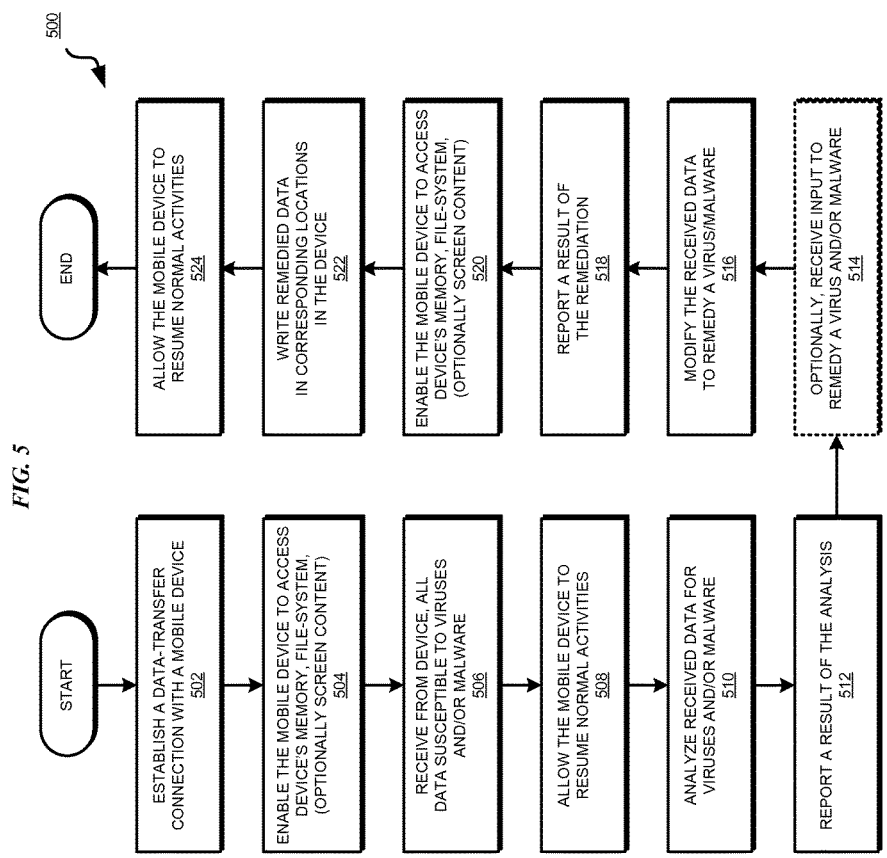
FIG. 5 depicts a flowchart of an example process for protecting mobile devices from malware in accordance with an illustrative embodiment.

With reference to FIG. 5, this figure depicts a flowchart of an example process for protecting mobile devices from malware in accordance with an illustrative embodiment. Process 500 can be implemented in application 302 of FIG. 3, which executes in system 402 of FIG. 4.

The application establishes a data-transfer connection with a mobile device (block 502). The application enables the mobile device to access data the device's memory, file-system, any other part or location where malware-susceptible data may be stored, and optionally the data from a display apparatus associated with the mobile device (block 504).

The application receives from the device, all data that is susceptible to malware, including but not limited to viruses of any type of behavior (block 506). The application allows the device to resume normal activities upon completion of the receive operation of block 506 (block 508).

The application analyzes the received data for viruses and malware infections (block 510). The application optionally sends a report of a result of the analysis to the device (block 512). The application optionally receives an input to remedy selected viruses or malware infections (block 514).

The application modifies the received data to remedy a virus or malware infection (block 516). The application modifies the remediation of block 516 according to the input of block 514 when optional block 514 is executed.

The application optionally sends a report of the remediation to the device (block 518). The application enables the mobile device to access data the device's memory, file-system, any other part or location from where malware-susceptible data was received, including data storage of the display apparatus associated with the mobile device (block 520).

The application writes the modified and unmodified portions of the post-remediation data to their respective locations in the device (block 522). In certain circumstances, a process executing on the mobile device may be using the data that was infected with malware. When such data is replaced or substituted with the post-remediation data, the process may have to be restarted or otherwise manipulated so that the process can begin using the post-remediation data. Accordingly, in one embodiment, the application restarts or otherwise manipulates such processes or threads that were using the malware infected data so that the processes or threads can use the post-remediation data instead.

The application allows the device to resume normal activities, such as by resetting the mode set in block 520 (block 524). The application ends process 500 thereafter.

Thus, a computer implemented method is provided in the illustrative embodiments for protecting mobile devices from malware. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for protecting data of a mobile device, the method comprising:
  causing, using a processor at a data processing system distinct from the mobile device, the mobile device to switch from a first mode to a second mode, wherein the second mode of the mobile device (i) enables the data processing system to download data from the mobile device, the data being located in a memory area of the mobile device that is used for rendering a graphical display of the data on a screen in the mobile device, and the data remaining to be displayed on the screen, and
  (ii) temporarily disables a function of the mobile device, wherein the mobile device resumes the function when the data processing system resets the mobile device from the second mode to the first mode;

modifying, at the data processing system, and responsive to detecting a malware from a set of malware in the data, the data to form a modified screen data, wherein the modifying removes the malware from the data; and causing, from the data processing system, the modified screen data to be written to the memory area of the mobile device that is used for rendering the graphical display of the data on the screen of the mobile device.

2. The method of claim 1, wherein the first mode prevents the data processing system from accessing a subset of data storage locations in the mobile device over a data connection.

3. The method of claim 2, wherein the second mode causes the mobile device to allow the data processing system access to the subset of data storage locations in the mobile device over the data connection.

4. The method of claim 1, wherein the data processing system causing the mobile device to switch to the second mode temporarily prevents the mobile device from performing a normal activity of the mobile device.

5. The method of claim 1, further comprising receiving at the data processing system from a memory in the mobile device and a file-system in the mobile device, wherein the memory in the mobile device stores data that is not a part of the file-system.

6. The method of claim 5, wherein the memory comprises a second memory used by an operating system of the mobile device.

7. The method of claim 5, wherein the memory comprises a second memory used by graphical display apparatus of the mobile device.

8. The method of claim 1, further comprising:
establishing, from the data processing system, a data connection with the mobile device; and
transferring, to the data processing system over the data connection, data from a set of data storage locations.

9. The method of claim 8, further comprising:
associating a first portion of the received data with a first data storage location in the set of data storage locations; and
associating a second portion of the received data with the second data storage location in the set of data storage locations.

10. The method of claim 9, further comprising:
using the first data storage location associated with the first portion in the causing the modified first portion to be stored in the first data storage location in the mobile device.

11. The method of claim 1, wherein the receiving comprises:
performing, at the data processing system, a downloading operation, wherein the downloading operation causes the mobile device to transfer the data over a data connection between the data processing system and the mobile device.

12. The method of claim 11, further comprising:
resetting, using the data processing system, subsequent to the downloading, the mobile device from the second mode to the first mode.

13. The method of claim 1, further comprising:
failing, at the data processing system, to detect any malware from the set of malware in the second portion of the received data; and
omitting, at the data processing system, modifying the second portion of the received data responsive to the failing.

14. The method of claim 1, further comprising:
causing, using the data processing system, the mobile device to switch from the first mode to the second mode to perform the storing; and
resetting, using the data processing system, subsequent to the storing, the mobile device from the second mode to the first mode.

15. The method of claim 1, further comprising:
identifying, at the data processing system, responsive to analyzing, the malware to the mobile device;
receiving, at the data processing system, an input from the mobile device, the input selecting the malware for remediation, wherein the modifying is further responsive to the input.

16. The method of claim 15, further comprising:
sending, using the data processing system, to the mobile device an analysis report, the identifying resulting from the analysis report.

* * * * *